(12) United States Patent
Lee

(10) Patent No.: US 9,172,286 B2
(45) Date of Patent: Oct. 27, 2015

(54) LEVELING MOTOR

(75) Inventor: Suhyoung Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 767 days.

(21) Appl. No.: 13/331,821

(22) Filed: Dec. 20, 2011

(65) Prior Publication Data

US 2012/0153756 A1   Jun. 21, 2012

(30) Foreign Application Priority Data

Dec. 21, 2010 (KR) .................. 10-2010-0131194

(51) Int. Cl.
*H02K 7/116* (2006.01)
*H02K 7/06* (2006.01)

(52) U.S. Cl.
CPC .......................... *H02K 7/06* (2013.01)

(58) Field of Classification Search
CPC .......... B60Q 2200/00; B60Q 2200/34; B60Q 2200/36; B60Q 2200/30; B60Q 1/072; B60Q 1/076
USPC ............... 310/156.14, 156.16–156.18, 75 D; 362/465–468
See application file for complete search history.

(56) References Cited

U.S. PATENT DOCUMENTS

| | | | | |
|---|---|---|---|---|
| 2,734,359 A * | 2/1956 | Mulheim et al. | ................ | 464/97 |
| 4,223,375 A * | 9/1980 | Alphen | ......................... | 362/466 |
| 4,524,407 A * | 6/1985 | Igura | ............................. | 362/465 |
| 4,546,298 A * | 10/1985 | Wickham et al. | ............. | 318/372 |
| 4,868,906 A * | 9/1989 | Oilschlager, Jr. | ............. | 310/113 |
| 4,967,319 A * | 10/1990 | Seko | .............................. | 362/466 |
| 6,152,584 A * | 11/2000 | Tsukamoto | ................... | 362/465 |
| 6,822,356 B2 * | 11/2004 | Suzuki et al. | .................. | 310/71 |
| 6,848,814 B2 * | 2/2005 | Watanabe et al. | ............. | 362/465 |
| 7,195,384 B2 * | 3/2007 | Chen | ............................. | 362/512 |
| 7,309,943 B2 * | 12/2007 | Henderson et al. | ...... | 310/323.02 |
| 7,500,413 B2 * | 3/2009 | Huang et al. | .................... | 74/425 |
| 7,815,352 B2 * | 10/2010 | Naganawa et al. | ........... | 362/523 |
| 8,147,106 B2 * | 4/2012 | Eto et al. | ....................... | 362/523 |
| 2001/0043474 A1 * | 11/2001 | Kusagaya | ..................... | 362/466 |
| 2002/0018348 A1 * | 2/2002 | Miki et al. | ..................... | 362/514 |
| 2003/0090905 A1 * | 5/2003 | Uchida et al. | ................. | 362/465 |
| 2004/0165395 A1 * | 8/2004 | Suzuki et al. | ................. | 362/465 |
| 2005/0184599 A1 * | 8/2005 | Culpi et al. | ..................... | 310/12 |
| 2006/0220482 A1 * | 10/2006 | Son et al. | ................. | 310/156.08 |
| 2007/0082577 A1 * | 4/2007 | Tajima | ............................ | 445/66 |
| 2010/0166579 A1 * | 7/2010 | Noh et al. | .................. | 417/423.7 |

FOREIGN PATENT DOCUMENTS

CN   1778030 A   5/2006
CN   1951722 A   4/2007

OTHER PUBLICATIONS

Office Action dated Mar. 10, 2015 in Chinese Application No. 201110433285.4.

* cited by examiner

*Primary Examiner* — Naishadh Desai
(74) *Attorney, Agent, or Firm* — Saliwanchik, Lloyd & Eisenschenk

(57) ABSTRACT

Disclosed is a leveling motor, which removes a gap from a threaded portion converting a rotating force of the leveling motor into an axial feeding force to minimize a movement error and enable a leveling operation to be precisely controlled, and includes a housing, a shaft axially moving in the housing and having on an outer circumference thereof a threaded portion, a threaded pipe provided on an outer circumference of the shaft and having on an inner circumference thereof a grooved portion that corresponds to the threaded portion, and an elastic member supplying an upward elastic force to the shaft, whereby the threaded portion axially comes into close contact with the grooved portion by the elastic force of the elastic member.

6 Claims, 3 Drawing Sheets

LEVELING MOTOR

CROSS-REFERENCE TO RELATED APPLICATION

This application claims the benefit under 35 U.S.C. §119 of Korean Patent Application No. 10-2010-0131194, filed on Dec. 21, 2010, which is hereby incorporated by reference in its entirety.

BACKGROUND OF THE INVENTION

1. Field of the Invention

The present invention relates generally to a leveling motor and, more particularly, to a leveling motor configured to remove a gap from a threaded portion converting a rotating force of the leveling motor into an axial feeding force, thus minimizing a movement error and enabling precisely controlled leveling operation.

2. Description of the Related Art

Generally, a luxury vehicle is equipped with a headlamp leveling device to adjust an irradiation angle of a headlamp according to a change in position of a vehicle body.

Such a headlamp leveling device functions to adjust the irradiation angle of light by pushing and pulling a reflector using a predetermined drive means. Such a drive means is a leveling motor of the headlamp leveling device.

FIG. 1 is a side sectional view showing a conventional leveling motor, and FIG. 2 is an enlarged side sectional view showing a threaded portion of a shaft of the leveling motor.

A motor 10 largely includes a housing 20 receiving parts driven by electromagnetic force, a device accommodated in the housing 20 and driven by the electromagnetic force, and a shaft 11 axially moving out of the housing 20 to adjust an irradiation angle of a lamp.

An upper end of the shaft 11 protrudes upwards from the housing 20. The shaft 11 is supported in the housing 20 to be moved up and down by a threaded pipe 21.

To be specific, a threaded portion 12 is formed on a predetermined portion of an outer circumference of the shaft 11, and the threaded pipe 21 is disposed to surround an outer circumference of the shaft 11 and has a grooved portion 22 to correspond to the threaded portion 12.

If the threaded pipe 21 rotates, the screw-shaped threaded portion 12 formed on the outer circumference of the shaft 11 vertically moves along the grooved portion 22.

However, a gap (d) exists between the threaded portion 12 and the grooved portion 22. Such a gap (d) causes a movement error in an axial direction.

FIG. 2 shows the gap in detail. A root of each thread of the threaded portion 12 is in close contact with a groove. Thus, a crest of the thread is spaced apart from the groove in an axial direction. Here, if the threaded pipe 21 provides a downward feeding force for the shaft 11, a backlash occurs in proportion to a distance in which the groove is to move to come into contact with the crest of the thread.

Such a gap causes the movement error of the leveling motor, thus making it difficult to precisely control the irradiation angle of the headlamp.

BRIEF SUMMARY

Accordingly, the present invention has been made keeping in mind the above problems occurring in the prior art, and an object of the present invention is to provide a leveling motor, which is constructed to minimize a gap of a thread while a shaft of the leveling motor is being moved, thus being capable of minimizing a movement error.

In order to accomplish the above object, the present invention provides a leveling motor, the motor comprising a housing, a shaft axially moving in the housing and having on an outer circumference thereof a threaded portion, a threaded pipe provided on an outer circumference of the shaft and having on an inner circumference thereof a grooved portion that corresponds to the threaded portion, and an elastic member supplying an upward elastic force to the shaft, whereby the threaded portion axially comes into close contact with the grooved portion by the elastic force of the elastic member. Therefore, a gap between the threaded portion and the grooved portion can be eliminated, so that a leveling error can be minimized.

Further, the elastic member comprises a coil spring, connected at an upper end thereof to a lower end of the shaft and connected at a lower end thereof to a bottom of the housing. Therefore, the lower end of the shaft is supported, thus enabling a precise close contact.

Further, an outer circumference of the elastic member is supported by a lower end of the inner circumference of the threaded pipe to limit a horizontal movement of the elastic member. Therefore, an unnecessary movement of the elastic member is prevented, so that operational reliability is improved.

The leveling motor further includes a protrusion protruding upwards from the bottom of the housing to limit the horizontal movement of the elastic member. Therefore, a horizontal movement of the elastic member can be prevented.

The leveling motor further includes a spherical connector interposed between the shaft and the elastic member. Therefore, an elastic force may be precisely transmitted in an axial direction while a load between the shaft and the elastic member is minimized.

The leveling motor further includes a contact member interposed between the connector and the elastic member to support a bottom of the connector. Therefore, a frictional force between the elastic member and a connector can be minimized.

Further, the contact member takes a shape of a disc. Therefore, the connector can be effectively supported.

The present invention provides a leveling motor, the motor comprising a shaft having on an outer circumference thereof threads, a threaded pipe provided on the outer circumference of the shaft, transmitting a rotating force through grooves to the threads, thus moving the shaft axially, and an elastic member disposed under a lower end of the shaft and supplying an upward elastic force so that crests of the threads come into close contact with the grooves. Therefore, it is possible to precisely control the leveling motor in an axial direction.

The leveling motor according to the present invention constructed as described above advantageously eliminates the gap of each thread via the elastic force, thus minimizing the movement error of the shaft, and allowing an irradiation angle of a headlamp to be precisely controlled.

Further, a member for minimizing a contact area is disposed on a junction between the shaft and the elastic member, and a structure for preventing the movement of the elastic member is provided on the bottom of the housing, thus improving the operational reliability of members for eliminating the movement error.

DETAILED DESCRIPTION OF THE INVENTION

Hereinafter, a leveling motor according to a preferred embodiment of the present invention will be described in detail with reference to the accompanying drawings.

Figure 1:
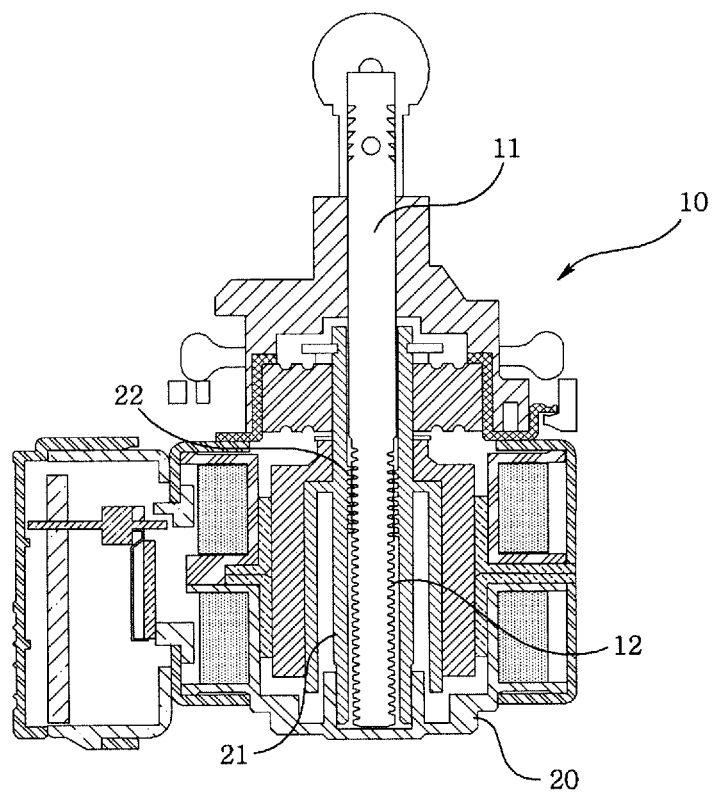
FIG. 1 is a side sectional view showing a conventional leveling motor.
Figure 2:
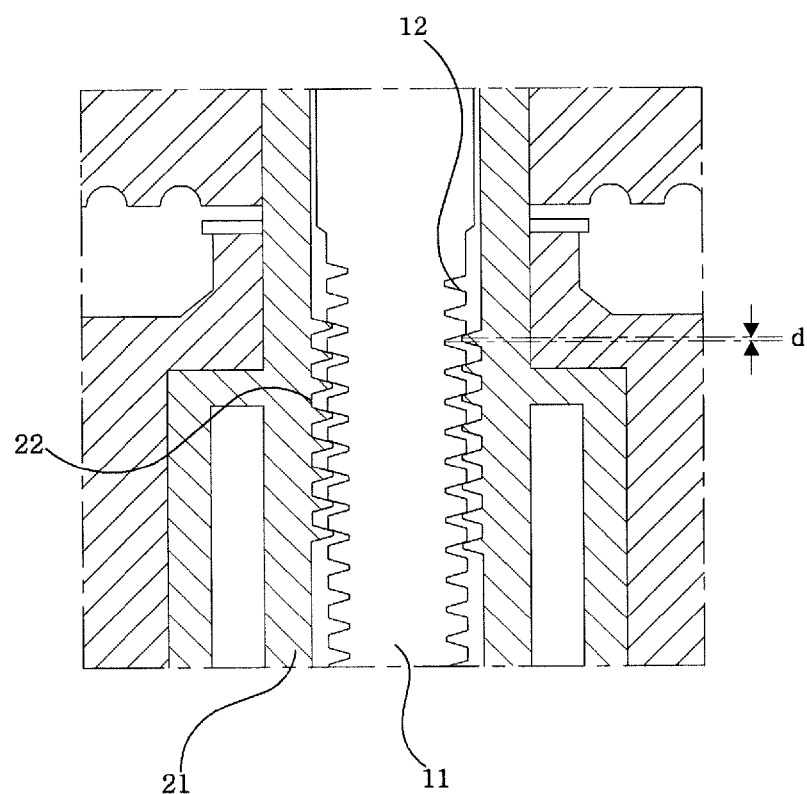
FIG. 2 is an enlarged side sectional view showing a gap of a threaded portion of the leveling motor shown in FIG. 1.
Figure 3:
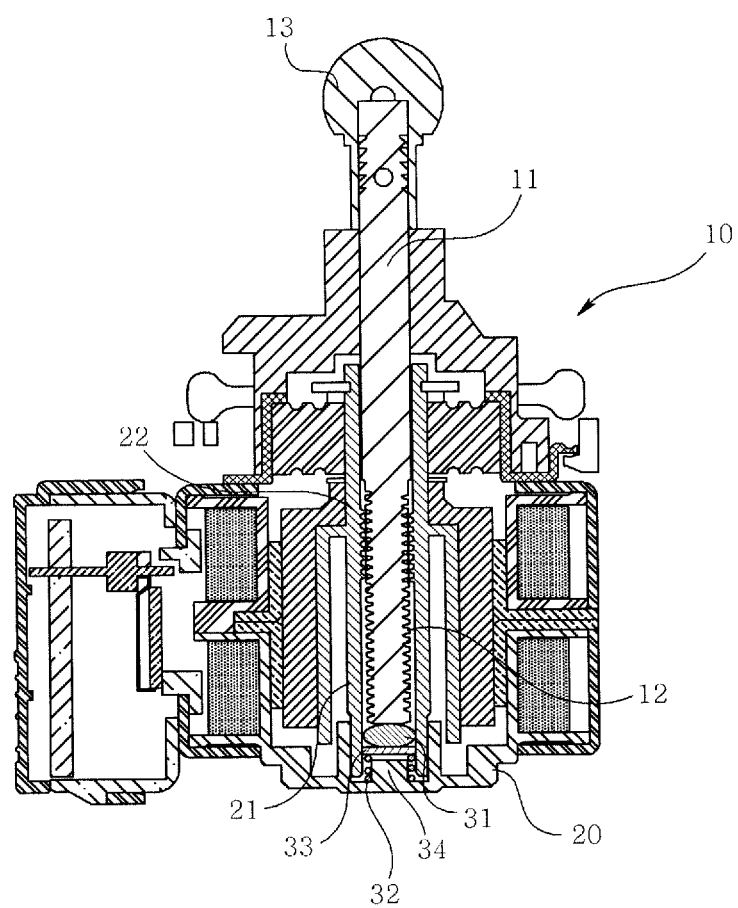
FIG. 3 is a side sectional view showing a leveling motor according to the present invention.

FIG. 3 is a side sectional view showing a leveling motor according to the present invention. Hereinafter, a direction in which a shaft 11 is ejected is referred to as an upper side or an upper part, and a direction in which the shaft 11 is retracted is referred to as a lower side or a lower part.

A housing 20 receives parts for moving the shaft 11 up and down by an electromagnetic force, and has a cylindrical interior. As described above, while the shaft 11 placed along a central axis of the housing 20 moves up and down, an irradiation angle of a headlamp is adjusted.

A screw-shaped threaded portion 12 is formed on a predetermined portion of an outer circumference of the shaft 11. A threaded pipe 21 is provided on the outer circumference of the shaft 11, and a grooved portion 22 is formed on an inner circumference of the threaded pipe 21 to correspond to a shape of the threaded portion 12.

The threaded portion 12 engages with the grooved portion 22 to move up or down by a rotating force of the grooved portion 22. The threaded pipe 21 having on the inner circumference thereof the grooved portion 22 performs a rotating movement by parts that are disposed in the leveling motor 10 and perform electromagnetic interaction.

Meanwhile, the threaded pipe 21 may be a member that is directly rotated by interaction between a magnet and a coil provided on the outer circumference of the threaded pipe 21, or may be a member that receives a rotating force transmitted from an additional motor.

The shaft 11 is disposed such that, when the shaft 11 moves down to be maximally retracted into the housing 20, a lower end of the shaft 11 is adjacent to a bottom of the housing 20, and an upper end thereof is exposed upwards. Preferably, a ball 13 is coupled to the upper end of the shaft 11, which is coupled to a predetermined portion of the headlamp in a ball-joint manner and then is pushed or pulled to adjust the irradiation angle.

According to the present invention, in order to cause the threaded portion 12 and the grooved portion 22 to come into closer contact with each other and to minimize a gap, an elastic member 32 is disposed under the lower end of the shaft 11.

The elastic member 32 is connected at an upper end thereof to the lower end of the shaft 11 and supported at a lower end thereof by the housing 20 to provide an elastic force for biasing the shaft 11 upwards.

Preferably, the elastic member 32 comprises a cylindrical coil spring. Thus, an upper end of the coil spring is connected to the lower end of the shaft 11, while the lower end thereof is supported by the bottom of the housing 20. Of course, the elastic member 32 may selectively use an elastic-force supplying member such as a plate spring or a rubber, instead of the coil spring.

The elastic member 32 provides an elastic force while supporting the lower end of the shaft 11. Hence, the threaded portion 12 can come into close contact with the grooved portion 22. In this case, as described above, a backlash caused by a change in the moving direction of the threaded pipe 21 or an external force around the ball 13 may be eliminated by an elastic restoring force of the elastic member 32.

Therefore, it should be noted that a structure of compensating for the gap using the elastic force can minimize a movement error of the leveling motor 10.

Further, the shaft 11 receives a rotating force via the threaded pipe 21 and moves up and down. However, when the rotating force is transmitted to a contact portion between the shaft 11 and the elastic member 32, the elastic member 32 may be twisted or overloaded.

Therefore, a member for minimizing a load is preferably provided between the upper end of the elastic member 32 and the lower end of the shaft 11.

According to such a concept, the connector 31 is disposed between the elastic member 32 and the shaft 11. The connector 31 has a spherical shape or an elliptical cross-section. Thereby, a contact area between the lower end of the shaft 11 and the connector 31 can be minimized.

As described above, a contact area between the elastic member 32 and the lower end of the shaft 11 is minimized, so that an elastic force for eliminating a vertical gap can be precisely transmitted and a load caused by a contact surface can be minimized.

If the elastic member 32 comprises a coil-shaped spring, the elastic member 32 is in surface or line contact with the connector 31, so that a predetermined frictional force is generated. Hence, a construction for minimizing a contact area between the elastic member 32 and the connector 31 is additionally required.

Therefore, in order to minimize the contact area between the elastic member 32 and the connector 31, a contact member 33 is further provided between the upper end of the elastic member 32 and the connector 31.

The contact member 33 is a disc-shaped member, and is disposed on the upper end of the elastic member 32. An upper surface of the contact member 33 is brought into contact with the connector 31. Thus, the upper end and lower end of the connector 31 are supported, respectively, by the shaft 11 and the elastic member 32 while minimizing the contact area, thus maximizing operational reliability and effect of eliminating the movement error.

Meanwhile, the elastic member 32 is disposed on the bottom of the housing 20, and a horizontal movement of the elastic member 32 must be limited to precisely support the shaft 11. Thus, the outer circumference of the elastic member 32 is preferably supported on a lower end of the inner circumference of the threaded pipe 21. Thereby, a hollow interior provided in the lower end of the threaded pipe 21 functions as a kind of stopper to prevent the movement of the elastic member 32.

The outer circumference of the elastic member 32 may be supported by an inner circumference of a cylindrical protrusion that protrudes upwards from the bottom of the housing 20.

Further, if the elastic member 32 is a coil spring, it is more preferable that a protrusion 34 protrude upwards from the bottom of the housing 20. The protrusion 34 protrudes upwards in the hollow elastic member 32, thus preventing the elastic member 32 from moving leftwards or rightwards.

The leveling motor constructed as described above is advantageous in that the threaded portion of the shaft comes into close contact with the grooved portion of the threaded pipe by the elastic force, so that the movement error of the shaft can be minimized.

Further, the leveling motor is advantageous in that the member for minimizing the contact area is disposed on the junction between the shaft and the elastic member, and the structure for preventing the undesirable movement of the elastic member is provided on a lower portion of the housing, so that the operational reliability of the members for eliminating the movement error is more improved.

Although the leveling motor has been illustrated with the motor for adjusting the irradiation angle of the headlamp, as an example, the concept of the present invention may be applied to various leveling actuators each having a shaft moved in an axial direction.

While the invention has been described in its preferred embodiments with reference to the accompanying drawings, it is to be understood that the invention is not limited thereto but may be variously embodied within the scope of the following claims.

What is claimed is:

1. A leveling motor for adjusting an irradiation angle of a lamp, comprising:
    a housing;
    a magnet coupled with a coil and disposed within the housing for generating an electromagnetic force;
    a shaft moving in the housing in an axial direction and having a threaded portion formed on a predetermined portion of an outer circumference of the shaft and a ball coupled at a first end the shaft;
    a threaded pipe disposed to surround the outer circumference of the shaft, and having a grooved portion on an inner circumference of the threaded pipe wherein the grooved portion is engaged with the threaded portion of the shaft, and wherein the threaded pipe is configured to rotate the threaded portion of the shaft by the electromagnetic force; and
    an elastic member disposed between a second end of the shaft and an inner surface of the housing,
    wherein the elastic member comprises a coil spring for providing an elastic force toward the second end of the shaft, wherein the threaded portion of the shaft comes into close contact with the grooved portion of the threaded pipe to inhibit a backlash present therebetween.

2. The leveling motor as set forth in claim 1, wherein an outer circumference of the elastic member is supported by a lower end of the inner circumference of the threaded pipe to limit a horizontal movement of the elastic member.

3. The leveling motor as set forth in claim 2, further comprising:
    a protrusion protruding upwards from the inner surface of the housing toward the second end of the shaft to limit the horizontal movement of the elastic member.

4. The leveling motor as set forth in claim 1, further comprising:
    a spherical connector interposed between the second end of the shaft and an upper end of the elastic member.

5. The leveling motor as set forth in claim 4, further comprising:
    a contact member interposed between the connector and the elastic member to support of the connector,
    wherein an upper surface of the contact member contacts a bottom of the connector.

6. The leveling motor as set forth in claim 5, wherein the contact member takes a disc shape.

* * * * *